United States Patent
Nagaoka et al.

(10) Patent No.: US 7,051,520 B2
(45) Date of Patent: May 30, 2006

(54) SULFUR PURGE CONTROL METHOD AND EXHAUST GAS PURIFYING SYSTEM

(75) Inventors: Daiji Nagaoka, Fujisawa (JP); Masashi Gabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 44 days.

(21) Appl. No.: 10/971,110

(22) Filed: Oct. 25, 2004

(65) Prior Publication Data

US 2005/0112046 A1    May 26, 2005

(30) Foreign Application Priority Data

Nov. 5, 2003  (JP)  .............................. 2003-376016

(51) Int. Cl.
F01N 3/00  (2006.01)
(52) U.S. Cl. ............................ 60/297; 60/274; 60/285; 60/286; 60/295; 60/303
(58) Field of Classification Search .................. 60/274, 60/276, 278, 280, 285, 286, 295, 297, 303
See application file for complete search history.

(56) References Cited

U.S. PATENT DOCUMENTS

| | | | | |
|---|---|---|---|---|
| 5,778,666 | A * | 7/1998 | Cullen et al. .................. | 60/274 |
| 6,173,571 | B1 | 1/2001 | Kaneko et al. | |
| 6,233,925 | B1 * | 5/2001 | Hirota et al. .................. | 60/285 |
| 6,490,860 | B1 * | 12/2002 | Farmer et al. ................. | 60/285 |
| 6,543,219 | B1 * | 4/2003 | Surnilla ........................ | 60/285 |
| 6,779,339 | B1 * | 8/2004 | Laroo et al. ................... | 60/297 |
| 2002/0112471 | A1 | 8/2002 | Shroder et al. | |

FOREIGN PATENT DOCUMENTS

| | | |
|---|---|---|
| DE | 198 51 843 A1 | 5/2000 |
| JP | 10-274031 | 10/1998 |
| WO | WO 01/00976 A1 | 1/2001 |

OTHER PUBLICATIONS

EP Search Report for corresponding EP Application No. EP 04105271.3-2311.

* cited by examiner

*Primary Examiner*—Binh Q. Tran
(74) *Attorney, Agent, or Firm*—Staas & Halsey LLP

(57) ABSTRACT

In an exhaust gas purifying system (1) for removing NOx by a NOx occlusion reduction type catalyst (11) for exhaust gas of an internal combustion engine, the air-fuel ratio in the exhaust gas is controlled by setting the target air-fuel ratio at a predetermined first air-fuel ratio which is a rich air-fuel ratio by a sulfur purge control means (C24) after the start of sulfur purge, and thereafter, the air-fuel ratio in the exhaust gas is controlled by changing the target air-fuel ratio to the predetermined second air-fuel ratio which is a stoichiometric air-fuel ratio, when the oxygen concentration (Od) in the downstream of the NOx occlusion reduction type catalyst (11) measured by an oxygen concentration detection means (C12) becomes lower than a predetermined threshold. Thereby, sulfur component accumulated in the NOx occlusion reduction type catalyst (11) can be purged efficiently, while preventing carbon monoxide from being discharged into the atmospheric air.

4 Claims, 6 Drawing Sheets

[Lean air-fuel ratio state]

[Prophase of rich air-fuel ratio state]

[Anaphase of rich air-fuel ratio state]

SULFUR PURGE CONTROL METHOD AND EXHAUST GAS PURIFYING SYSTEM

BACKGROUND OF THE INVENTION

The present invention concerns an exhaust gas purifying system provided with a NOx occlusion reduction type catalyst for removing NOx in the exhaust gas of an internal combustion engine such as a diesel engine and a sulfur purge control method in the exhaust gas purifying system.

Various researches and proposals have been made concerning the catalyst type exhaust gas purifying system for reducing and removing NOx from the exhaust gas of an internal combustion engine of an automobile, a floor type internal combustion engine and the like. In particular, NOx reduction type catalysts and three-way-catalysts are used for purifying the exhaust gas of an automobile and the like.

NOx occlusion reduction type catalyst is one such catalyst. This catalyst fulfils its ability of NOx occlusion or its ability of NOx release and removal based on the oxygen concentration in the exhaust gas. For this catalyst, a porous catalyst coat layer of alumina ($Al_2O_3$) or the like supports a catalyst metal that oxidizes NOx and a NOx occluding material that occludes NOx. As for this catalyst metal, platinum (Pt), palladium (Pd), or the like can be utilized. On the other hand, the NOx occluding material is composed of any one or several in combination of alkali metals, alkaline-earth metals, rare-earths and the like. These alkali metals include sodium (Na), potassium (K), cesium (Cs) and the like. The alkaline-earth metals include calcium (Ca), barium (Ba) and the like, while the rare-earths include yttrium (Y), lanthanum, and the like.

Now, NOx removal by the above described NOx occlusion reduction type catalyst will be explained.

In an exhaust gas condition in which the oxygen concentration in the exhaust gas is high (lean air/fuel ratio state) as in the normal driving state of diesel engine, lean-burn gasoline engine and the like, the exhaust gas is cleaned as shown in FIG. 4. Nitrogen monoxide (NO) to be discharged is oxidized with oxygen ($O_2$) which is present in the exhaust gas by the oxidizing ability of a catalyst metal 21 and 22, and becomes nitrogen dioxide ($NO_2$). Next, this nitrogen dioxide ($NO_2$) is occluded in a NOx occluding material 23 in the form of nitrate. As a result, the exhaust gas is cleaned.

However, when this occlusion of NOx continues, the NOx occluding material 23 such as barium transforms into nitride and is gradually saturated. Consequently, the NOx occluding material 23 loses its ability to occlude nitrogen dioxide ($NO_2$). Therefore, driving conditions of an engine are changed and the rich-burn is performed generating exhaust gas (rich spike gas) of low oxygen concentration, high carbon monoxide concentration, and high exhaust temperature and delivering the gas to the catalyst.

In this rich air-fuel ratio state of the exhaust gas, the NOx occluding material 23, which occluded nitrogen dioxide ($NO_2$) and changed into nitride, releases the nitrogen dioxide ($NO_2$) that it has occluded and returns to the original barium (Ba) and the like, as shown in FIG. 5. As oxygen ($O_2$) is absent in the exhaust gas, this released nitrogen dioxide ($NO_2$) is reduced on the catalyst metal using carbon monoxide (CO), hydrocarbon (HC) and hydrogen ($H_2$) in the exhaust gas as reducer. As a result, nitrogen dioxide ($NO_2$) is transformed into nitrogen ($N_2$), water ($H_2O$), and carbon dioxide ($CO_2$) and cleaned.

In this NOx occlusion reduction type catalyst, however, there is a problem that the NOx purifying efficiency falls as driving continues because sulfur (sulfur component) in the fuel is accumulated in the NOx occluding material in the catalyst. Consequently, as described in Japanese Patent Laid-Open 1998-274031, it is necessary to perform substantially periodical sulfur purges (sulfur component desorption) by setting the temperature of the exhaust gas flowing into the catalyst at approximately 600° C. to 650° C. or more and in rich atmosphere, though different depending on catalysts.

In this sulfur purge, there is a problem that carbon monoxide (CO) is discharged outside the engine.

In other words, in this sulfur purge, sulfur (S) is absorbed in the NOx occluding material in the form of nitride. Consequently, sulfur component (S) is released as sulfur dioxide ($SO_2$), by transforming sulfate into carbonate with carbon monoxide (CO), in an oxygen-free and high temperature state. For this reason, the oxygen-free and high temperature state is realized by putting the exhaust gas in a rich air-fuel ratio state and by raising the temperature of the catalyst in case of diesel engines. This rich air-fuel ratio state is realized by reducing the exhaust quantity through intake throttling, large quantity of EGR and the like, and by performing post-injection, direct gas oil addition to the exhaust pipe, and the like. In addition, the temperature rise of the catalyst is realized by heating the catalyst with the heat generated by the oxidation of added fuel through the catalytic function.

In this hot rich atmosphere, carbon monoxide (CO) is produced by partial decomposition of hydrocarbon (HC), fuel; namely, through combustion of hydrogen component. On the other hand, in the NOx occluding material, nitrogen dioxide ($NO_2$) is released more actively than sulfur dioxide ($SO_2$) because nitride reacts more with carbon monoxide (CO) and changes into carbonate, compared to sulfate.

For this reason, in the prophase of the rich air-fuel ratio state performed by this sulfur purge control, reactions as follow will occur. Though sulfur dioxide ($SO_2$) is released from the NOx occluding material 23, nitrogen dioxide ($NO_2$) is released more actively. As a result, as shown in FIG. 5, carbon monoxide (CO) is used for reduction and removal of NOx to be released. In addition, carbon monoxide (CO) reacts with oxygen ($O_2$) released by reduction of this nitrogen dioxide ($NO_2$). Hence, carbon monoxide (CO) is not discharged outside the engine.

However, in the later stage of the rich air-fuel ratio state as the sulfur purge progresses, reactions as follow will occur. Though the release of sulfur dioxide ($SO_2$) from the NOx occluding material 23 is sustained, the release of nitrogen dioxide ($NO_2$) almost terminates in the latter stage of the rich air-fuel ratio state. As a result, as shown in FIG. 6, carbon monoxide (CO) is no longer used for reduction of nitrogen dioxide ($NO_2$), and oxygen ($O_2$) released by this reduction also decreases. Then, the oxygen concentration falls rapidly and the carbon monoxide concentration increases. As a result, carbon monoxide (CO) is discharged outside the engine.

FIG. 7 schematically shows the circumstances of this rapid decrease of oxygen concentration by the upstream excess air factor $\lambda(u)$ and the downstream excess air factor $\lambda(d)$ of the NOx occlusion reduction type catalyst. FIG. 8 shows examples of time series of upstream oxygen concentration ($O_2(u)$) and downstream oxygen concentration ($O_2(d)$) of the NOx occlusion reduction type catalyst, sulfur dioxide ($SO_2$), and carbon monoxide (CO), in the sulfur purge of the prior art. It can be observed in the T1 portion indicated by an arrow that the upstream oxygen concentration ($O_2(u)$) decreases rapidly and carbon monoxide (CO) increases.

BRIEF SUMMARY OF THE INVENTION

The present invention has an object of providing a sulfur purge control method permitting to purge efficiently sulfur component accumulated in a NOx occlusion reduction type catalyst, all the way preventing discharge of carbon monoxide into the atmospheric air in an exhaust gas purifying system for removing NOx by the NOx occlusion reduction type catalyst and the exhaust gas purifying system.

The aforementioned object can be attained by a sulfur purge control method comprising steps of;

controlling the air-fuel ratio in an exhaust gas by setting the target air-fuel ratio at a predetermined first air-fuel ratio which is a rich air-fuel ratio by means of a sulfur purge control means, after starting the sulfur purge; and thereafter, controlling the air-fuel ratio in the exhaust gas by changing the target air-fuel ratio to a predetermined second air-fuel ratio which is a stoichiometric air-fuel ratio, when the oxygen concentration downstream a NOx occlusion reduction type catalyst measured by an oxygen concentration detection means becomes lower than a predetermined threshold, in an exhaust gas purifying system for removing NOx by the NOx occlusion reduction type catalyst from the exhaust gas of an internal combustion engine, the system comprising:

the oxygen concentration detection means for detecting the oxygen concentration downstream the NOx occlusion reduction type catalyst; a sulfur purge start judgment means; and the sulfur purge control means accompanying the control of exhaust gas air-fuel ratio state.

According to this sulfur purge control method, as the oxygen concentration in the exhaust gas increases in the sulfur purge after the termination of release of NOx from a NOx occluding material, the sulfur purge can be made more efficient, all the way preventing carbon monoxide from being emitted into the atmospheric air.

Here, in the aforementioned sulfur purge control method, if it is so composed that said predetermined first air-fuel ratio be between 0.93 and 0.98 which is converted to the excess air factor and said predetermined second air-fuel ratio be between 0.997 and 1.002 which is converted to the excess air factor, the sulfur purge becomes more efficient, all the way preventing more carbon monoxide from being emitted into the atmospheric air.

In addition, the exhaust gas purifying system for attaining the aforementioned object is an exhaust gas purifying system for removing NOx by the NOx occlusion reduction type catalyst from the exhaust gas of an internal combustion engine, comprising:

an oxygen concentration detection means for detecting the oxygen concentration downstream the NOx occlusion reduction type catalyst;

a sulfur purge start judgment means; and a sulfur purge control means accompanying the control of exhaust gas air-fuel ratio state, wherein said sulfur purge control means includes a first sulfur purge control means for controlling the air-fuel ratio state in the exhaust gas targeting a predetermined first air-fuel ratio which is a rich air-fuel ratio; and a second sulfur purge control means for controlling the air-fuel ratio state in the exhaust gas targeting a predetermined second air-fuel ratio which is a stoichiometric air-fuel ratio, and wherein the sulfur purge is controlled by said first sulfur purge control means when the oxygen concentration downstream the NOx occlusion reduction type catalyst measured by said oxide concentration detection means is equal or superior to a predetermined threshold, after the start of sulfur purge, while the sulfur purge is controlled by said second sulfur purge control means when lower than the predetermined threshold.

According to this exhaust gas purifying system, the aforementioned sulfur purge control method can be performed. As the oxygen concentration in the exhaust gas increases in the sulfur purge after the termination of release of NOx from a NOx occluding material, the sulfur purge can be made more efficient, all the way preventing carbon monoxide from being emitted into the atmospheric air.

Then, in the aforementioned exhaust gas purifying system, if it is so composed that said predetermined first air-fuel ratio be between 0.93 and 0.98 which is converted to the excess air factor and said predetermined second air-fuel ratio be between 0.997 and 1.002 which is converted to the excess air factor, the sulfur purge becomes more efficient, all the way preventing more carbon monoxide from being emitted into the atmospheric air.

According to the sulfur purge control method and the exhaust gas purifying system of the present invention, the sulfur purge can be made more efficient, all the way preventing carbon monoxide from being emitted into the atmospheric air, even after the termination of release of NOx from a NOx occluding material, because the air-fuel ratio in the exhaust gas is controlled by changing the target air-fuel ratio from the predetermined first air-fuel ratio which is a rich air-fuel ratio to a predetermined second air-fuel ratio which is a stoichiometric air-fuel ratio, when the oxygen concentration downstream a NOx occlusion reduction type catalyst becomes lower than a predetermined threshold, after the start of sulfur purge.

In other words, the oxygen concentration in the exhaust gas flowing in the NOx occlusion reduction type catalyst is raised by changing the air-fuel ratio state of the exhaust gas in the sulfur purge control of the NOx occlusion reduction type catalyst according to the variation of oxygen concentration, through the monitoring of the oxygen concentration downstream a NOx occlusion reduction type catalyst. Therefore, carbon monoxide production can be limited and, at the same time, the produced carbon monoxide can be oxidized and the emission of carbon monoxide into the atmospheric air can be prevented.

DETAILED DESCRIPTION OF THE INVENTION

Figure 1:
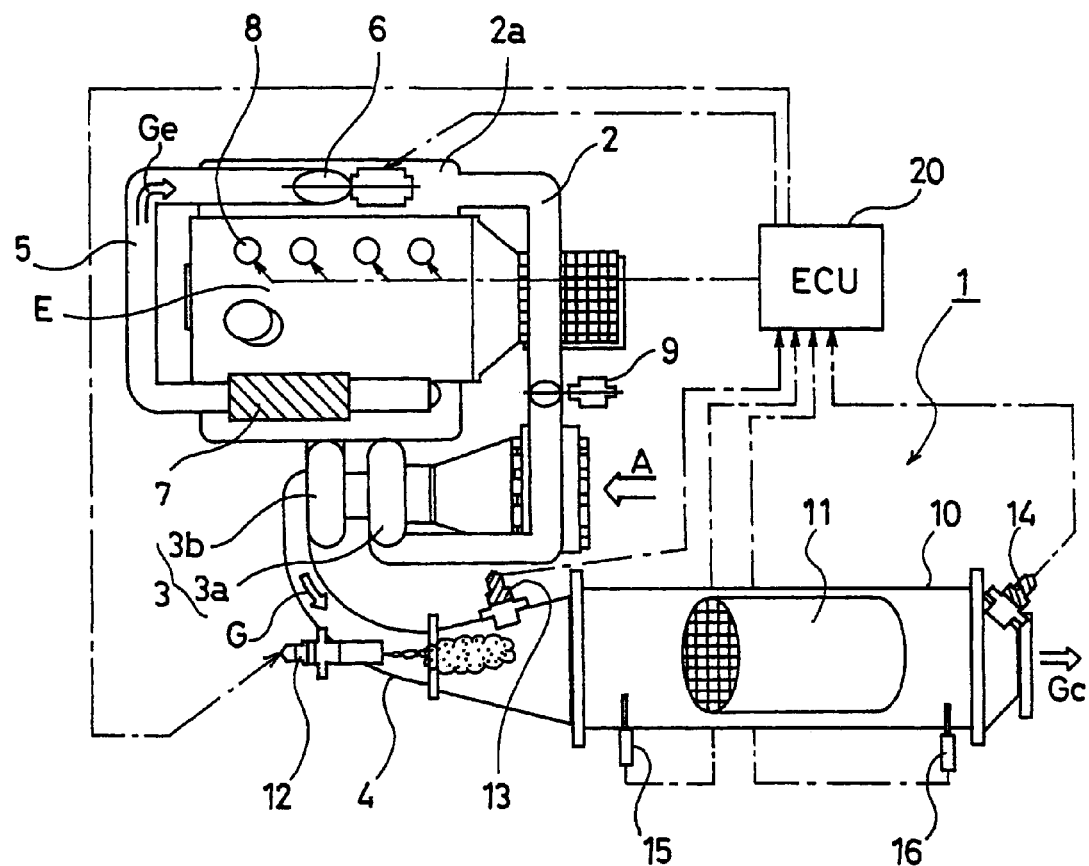
FIG. 1 shows a composition of an exhaust gas purifying system of an embodiment according to the present invention.

The sulfur purge control method and the exhaust gas purifying system of the embodiment according to the present invention shall be described referring to the drawings.

FIG. 1 shows a composition of an exhaust gas purifying system 1 of an embodiment according to the present invention. For this exhaust gas purifying system 1, an emission control device 10 having a NOx occlusion reduction type catalyst converter 11 provided with a NOx occlusion reduction type catalyst is disposed in an exhaust passage 4 of an engine (internal combustion engine).

This NOx occlusion reduction type catalyst converter 11 is formed with monolithic catalyst. In this monolithic catalyst, a catalyst coat layer is deposited on a support body of aluminum oxide, titan oxide and the like. This catalyst coat layer is made to support a catalytic metal such as platinum (Pt) and palladium (Pd), and a NOx occluding material (NOx occluding substance) such as barium (Ba).

In this NOx occlusion reduction type catalyst converter 11, NOx is prevented from flowing into the atmospheric air in the following manner. NOx in the exhaust gas is removed by occluding NOx with the NOx occluding material, when the oxygen concentration of the exhaust gas is high (lean air-fuel ratio state). On the other hand, when the oxygen concentration of the exhaust gas is low or null (rich air-fuel ratio state), NOx is prevented from flowing into the atmospheric air by releasing the occluded NOx, and reducing the released NOx through catalytic action of the catalytic metal.

A first oxygen concentration sensor 13 and a second oxygen concentration sensor 14 are respectively disposed in the upstream and down stream, namely, in front of and behind this NOx occlusion reduction type catalyst 11. As these first and second oxygen concentration sensors 13 and 14, a sensor detecting only the oxygen concentration may be used; however, a sensor integrating a λ sensor (excess air factor sensor), a NOx concentration sensor and an oxygen concentration sensor can be used.

In addition, in order to judge the temperature of the NOx occlusion reduction type catalyst 11, a first temperature sensor 15 and a second temperature sensor 16 are disposed respectively upstream and down stream, namely, in front of and behind the NOx occlusion reduction type catalyst 11.

Moreover, an HC supply valve 12 for supplying gas oil or other fuels that becomes reducer of NOx, namely hydrocarbon (HC), is installed in an exhaust passage 4 in the upstream of the NOx occlusion reduction type catalyst 11. This HC supply valve 12 injects hydrocarbon (HC) which is a fuel such as gas oil from a fuel tank that is not illustrated directly into the exhaust passage 4. This HC supply valve 12 composes an air-fuel ratio control means for making the air-fuel ratio of exhaust gas in rich state or in stoichiometric state (theoretical air-fuel ratio state). It should be appreciated that the arrangement of this HC supply valve 12 may be omitted, in the case where a similar air-fuel ratio control is performed by the post-injection during fuel injection in the cylinder of an engine E.

Then, a control unit (ECU: engine control unit) 20 is installed for performing a general control of the driving of the engine E and for performing the regeneration control of NOx removal capacity of the NOx occlusion reduction type catalyst converter 11. Detection values from the first as well as second oxygen concentration sensors 13 and 14, the first as well as the second temperature sensors 15 and 16 and the like are input in this control unit 20. Signals for controlling an EGR valve 6 of the engine E, a fuel injector 8 of a common-rail electric control fuel injection system for fuel injection as well as an intake throttle 9, and the like are output from this control unit 20.

In this exhaust gas purifying system 1, air A, exhaust gas G and EGR gas Ge flow as follow. The air A passes through a compressor 3a of a turbo-charger 3 and the intake throttle (intake throttle valve) 9 of an intake passage 2, and enters the cylinder from an intake manifold 2a. Then, the quantity of the air A is adjusted by the intake throttle (intake throttle valve) 9. On the other hand, the exhaust gas G generated in the cylinder is discharged out of an exhaust manifold 4a into the exhaust passage 4, drives a turbine 3b of the turbo-charger, passes through the emission control device 10, and is discharged out into the atmospheric air through a silencer that is not illustrated. This exhaust gas G becomes exhaust gas Gc that is purified by the emission control device 10. In addition, a part of exhaust gas G passes through an EGR cooler 7 and an EGR valve 6 of an EGR passage 5 as EGR gas Ge, and recirculates to the intake manifold 2a. This EGR gas Ge is adjusted in terms of its quantity by the EGR valve 6.

Figure 2:
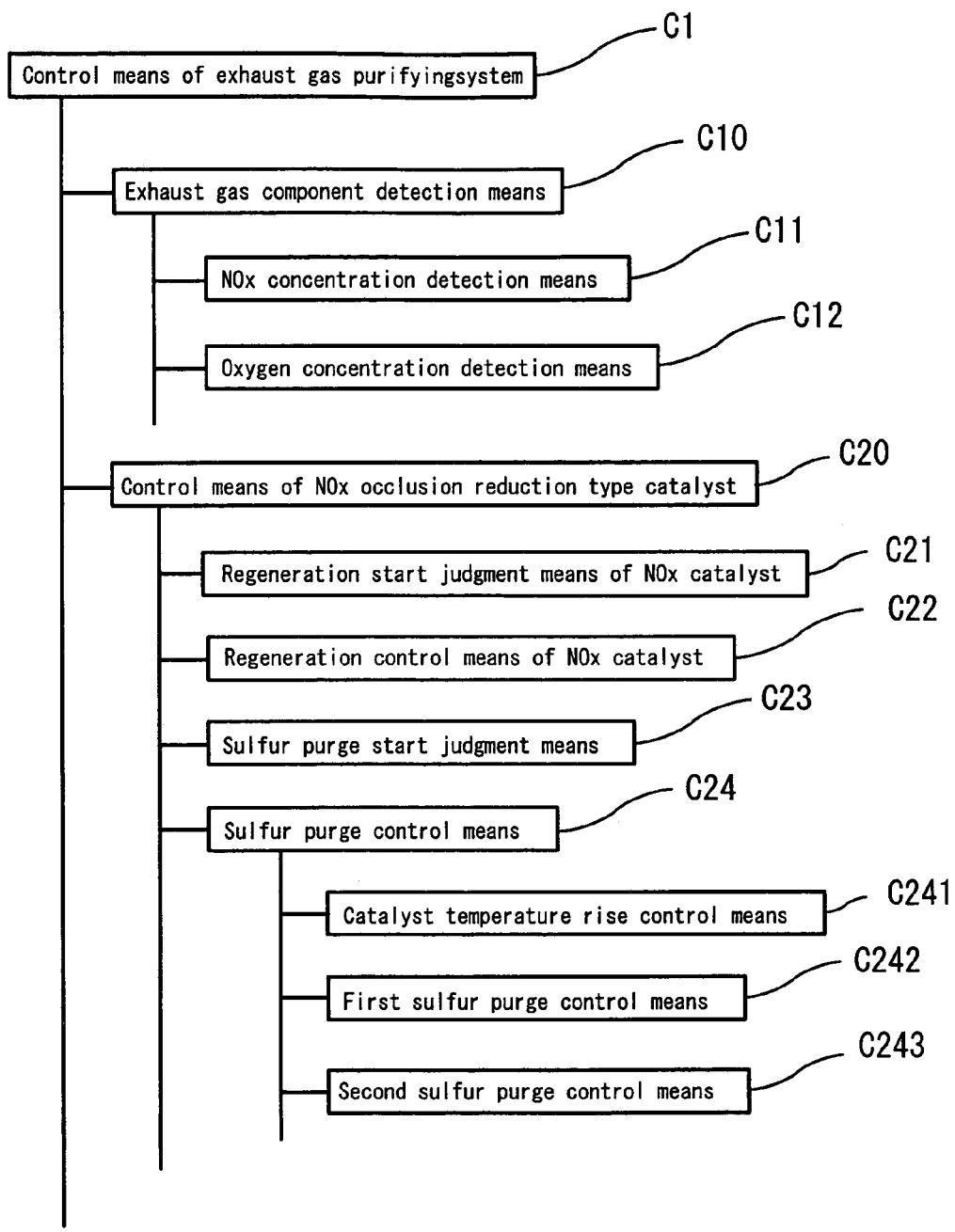
FIG. 2 shows a composition of a control means of the exhaust gas purifying system of the embodiment according to the present invention.

Then, the control unit of the exhaust gas purifying system 1 is built in a control unit 20 of the engine E. This control unit 20 performs the driving control of the engine E and the control of the exhaust gas purifying system 1. As shown in FIG. 2, the control unit of this exhaust gas purifying system 1 is composed by providing a control means C1 of exhaust gas purifying system 1 that has an exhaust gas composition detection means C10, a control means C20 of NOx occlusion reduction type catalyst and the like.

The exhaust gas composition detection means C10 is composed by having a NOx concentration detection means C11 and an oxygen concentration detection means C12. This means C10 is the means for detecting NOx concentration and oxygen concentration in the exhaust gas. The NOx concentration detection means C11 is composed of a NOx concentration sensor and the like that are not illustrated. The oxygen concentration detection means C12 is composed of the first and second oxygen concentration sensors 13 and 14 and the like. It should be appreciated that, the NOx concentration detection means C11 and the oxygen concentration detection means C12 jointly use this sensor, in case of using a sensor integrating a λ sensor, a NOx concentration sensor and an oxygen concentration sensor.

The control means C20 of NOx occlusion reduction type catalyst is means for performing the regeneration of the NOx occlusion reduction type catalyst converter 11 and the control of sulfur purge and the like. This means C20 is composed by having a regeneration start judgment means C21 of NOx catalyst, a regeneration control means C22 of NOx catalyst, a sulfur purge start judgment means C23, a sulfur purge control means C24 and the like.

The regeneration start judgment means C21 of NOx catalyst calculates the NOx removal rate from NOx concentrations upstream and downstream the NOx occlusion reduction type catalyst converter 11 and judges to start the regeneration of the NOx catalyst in case where this NOx removal rate becomes lower than a predetermined threshold. These NOx concentrations are detected, for instance, by the NOx concentration detection means C11.

In addition, the regeneration control means C22 of NOx catalyst sets the exhaust gas state to a predetermined rich air-fuel ratio state and a predetermined temperature range (approximately 200° C. to 600° C. depending on catalysts), by the post-injection or injection into the exhaust pipe in the fuel injection control of the engine E, EGR control, intake throttling control and the like. Thereby, the NOx removal performance, namely NOx occluding capacity is restored to regenerate the NOx catalyst.

In addition, the sulfur purge start judgment means C23 is the means for deciding to start the sulfur purge control or not based on whether the sulfur has accumulated enough to deteriorate the NOx occluding capacity or not that is determined by multiplying the sulfur accumulation quantity Sa or by other methods. This means C23 decides to start the sulfur purge when the sulfur accumulation quantity Sa becomes equal or superior to the predetermined threshold Sa0.

The sulfur purge control means C24 is composed by having a catalyst temperature rise control means C241, a first sulfur purge means C242 and a second sulfur purge means C243. This means C24 performs the sulfur purge efficiently, while limiting emission of carbon monoxide (CO) into the atmospheric air. This catalyst temperature rise control means C241 is a means for raising the temperature of NOx occlusion reduction type catalyst until the sulfur purge becomes possible, by controlling the exhaust gas air-fuel ratio through post-injection or injection in the exhaust pipe, and by performing EGR control and intake throttling control. In addition, the first sulfur purge means C242 is a means for performing the sulfur purge by setting a first air-fuel ratio ($\lambda=0.93$ to 0.98 which is converted to excess air factor) to the target air-fuel ratio. The second sulfur purge means C243 is a means for performing the sulfur purge by setting a second air-fuel ratio ($\lambda=0.997$ to 1.002 which is converted to excess air factor) to the target air-fuel ratio.

Figure 3:
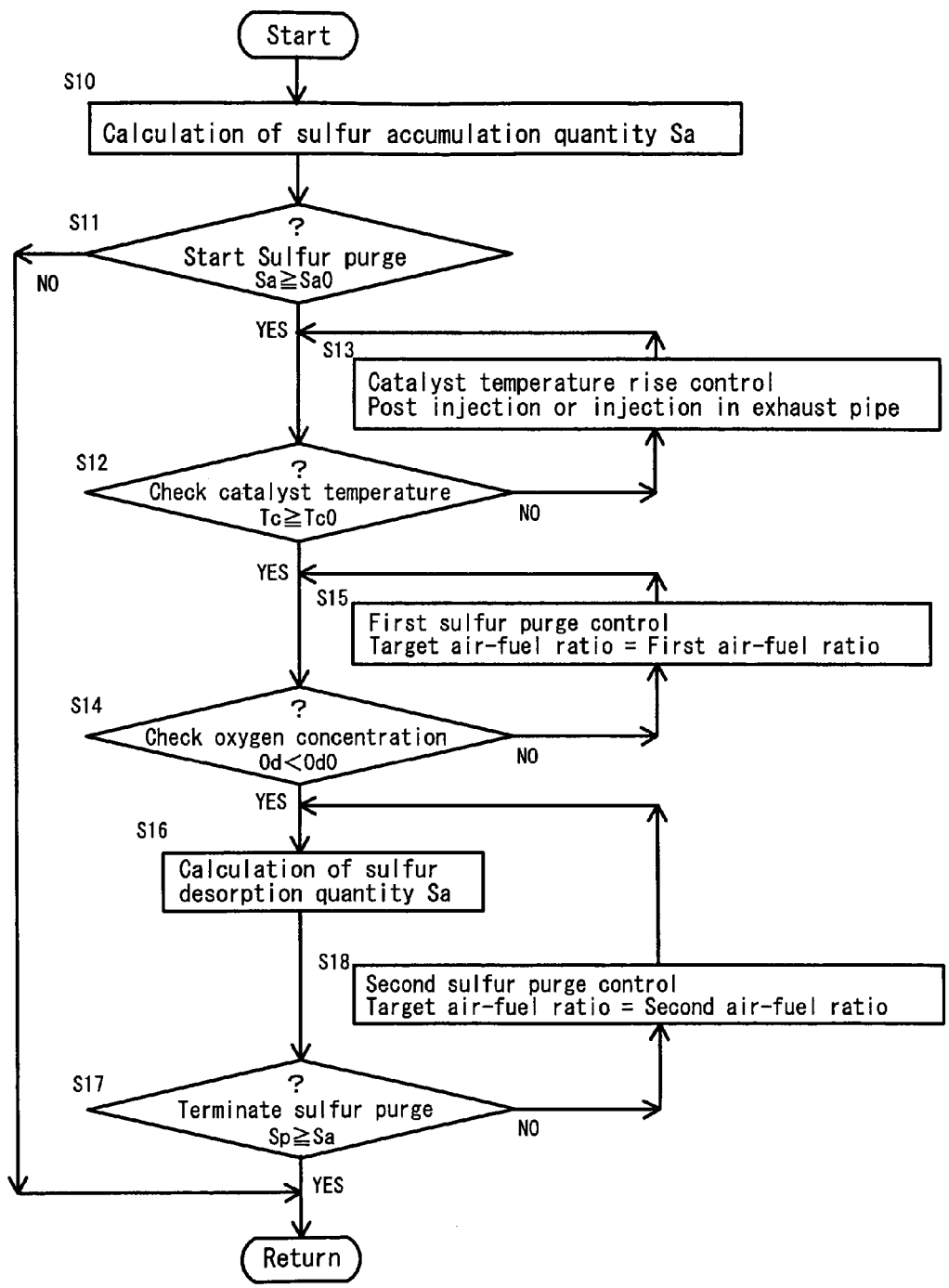
FIG. 3 shows an example of control flow for sulfur purge of the embodiment according to the present invention.
Figure 4:
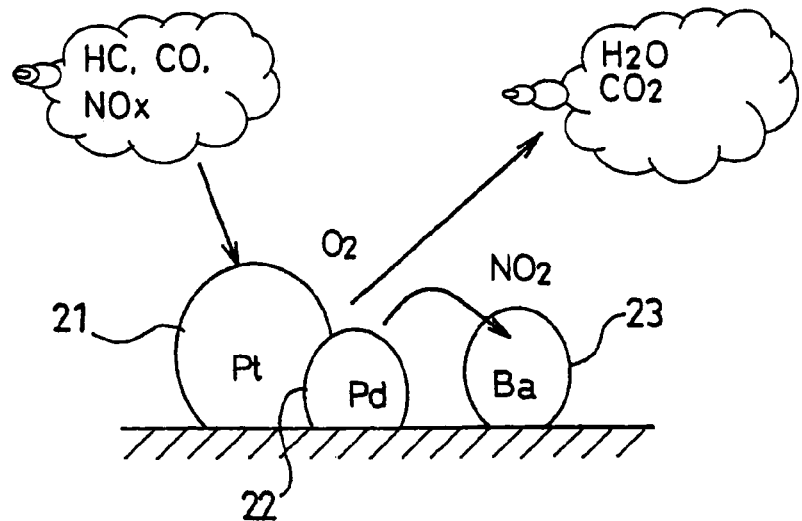
FIG. 4 shows schematically reactions in the lean air-fuel ratio state in a NOx occlusion reduction type catalyst.
Figure 5:
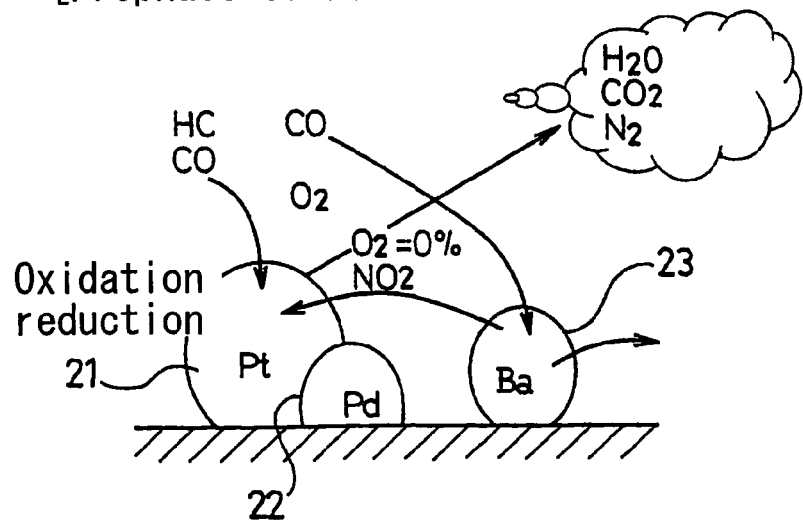
FIG. 5 shows schematically reactions in the prophase of rich air-fuel ratio state in the NOx occlusion reduction type catalyst.
Figure 6:
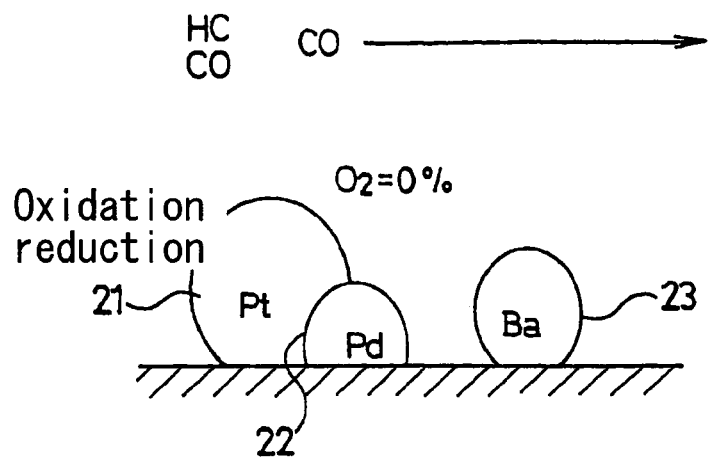
FIG. 6 shows schematically reactions in the anaphase of rich air-fuel ratio state in the NOx occlusion reduction type catalyst.
Figure 7:
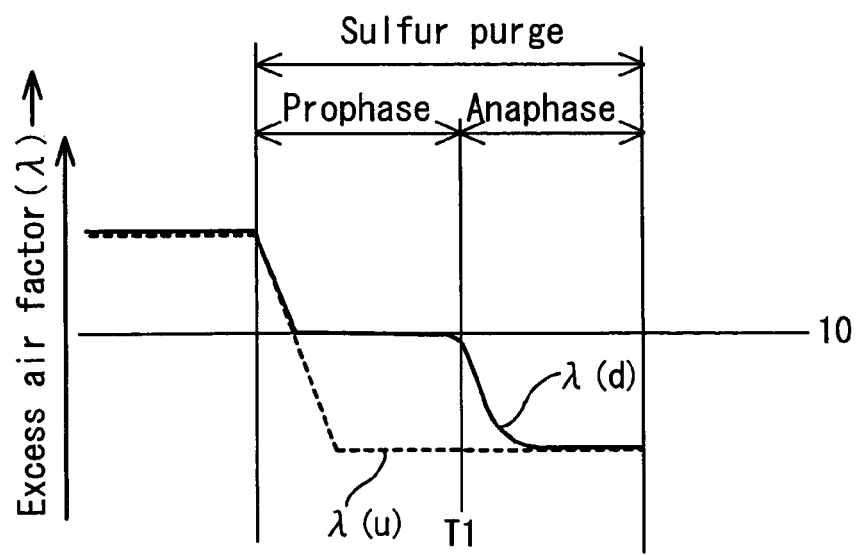
FIG. 7 shows schematically the temporal variation of oxygen concentration in a sulfur purge of the prior art.
Figure 8:
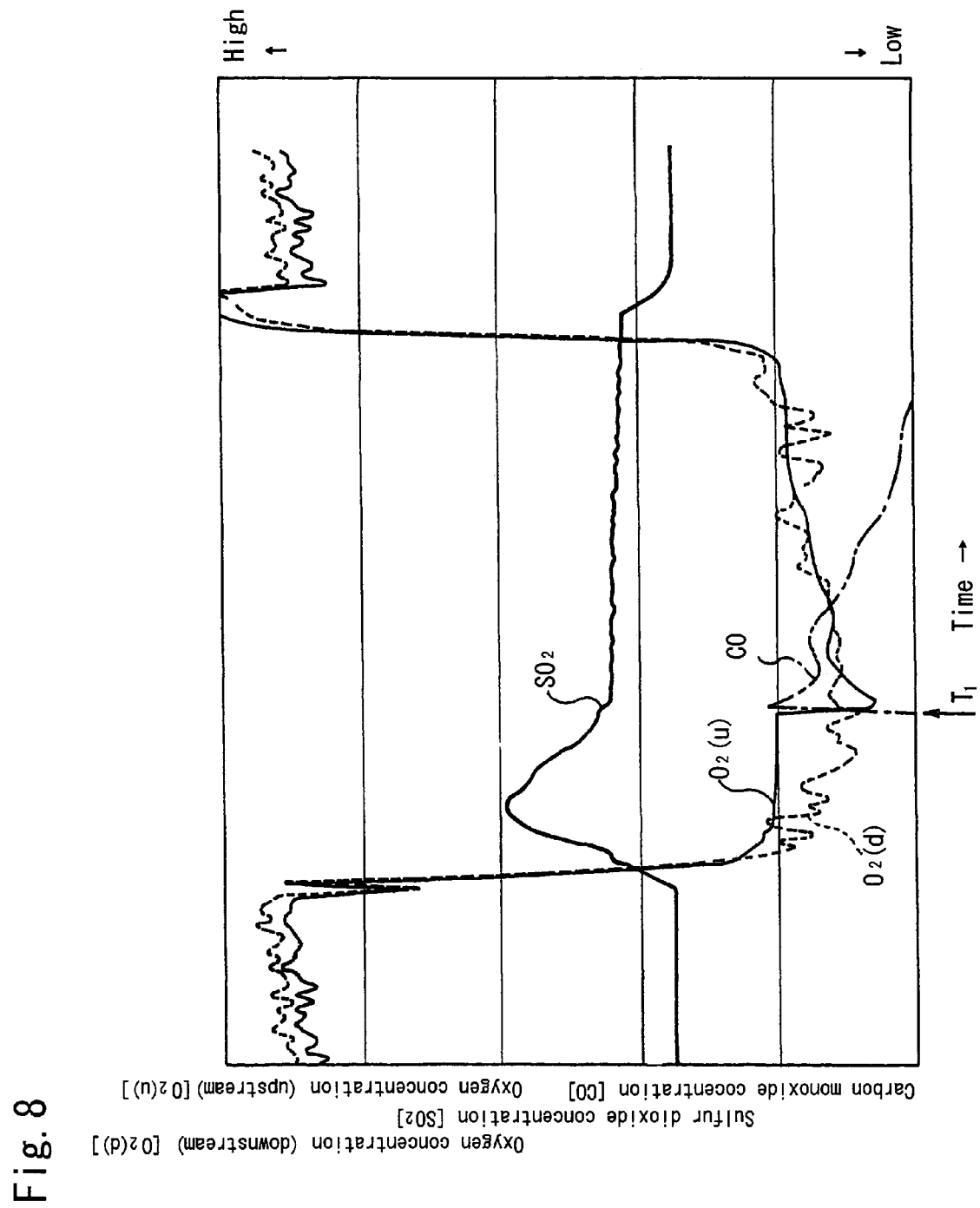
FIG. 8 shows an example of the time series of oxygen concentration, sulfur dioxide concentration monoxide concentration in the sulfur purge of the prior art.

The sulfur purge control method of the NOx occlusion reduction type catalyst according to the present invention in the exhaust gas purifying system 1 provided with these control means of exhaust gas purifying system is performed according to a control flow for sulfur purge as illustrated in FIG. 3.

This control flow in FIG. 3 is shown as in the following control flow. Namely, this control flow is called up repeatedly from the control flow of the entire control for the exhaust gas purifying system 1, together with the control flow concerning the regeneration of NOx occluding capacity of the NOx occlusion reduction type catalyst converter 11 and the like. This control flow judges if the sulfur purge is necessary or not, and performs the sulfur purge control when it is necessary.

When this control flow starts, in the step S10, sulfur accumulation quantity Sa occluded and accumulated by the NOx occlusion reduction type catalyst of the NOx occlusion reduction type catalyst converter 11 is calculated based on fuel consumption and the sulfur quantity contained in the fuel.

In the next step S11, it is judged by the sulfur purge start judgment means C23, whether or not to start the sulfur purge. In this judgment, the sulfur purge is started in the case where the sulfur accumulation quantity Sa becomes equal or superior to a predetermined limit value Sa0. In the case where it is judged not to start the sulfur purge in the judgment of the step S11, the control flow for this sulfur purge is terminated to return. If it is judged as the start of the sulfur purge, it proceeds to the step S12.

In the check of catalyst temperature of this step S12, the catalyst temperature Tc is calculated based on temperatures detected by the first temperature sensor 15 and the second temperature sensor 16 and it is judged if this catalyst temperature Tc is equal or superior to a predetermined judgment temperature (threshold) Tc. This predetermined judgment temperature is approximately in the range of 600° C. to 650° C., depending on catalysts, and shall be the value of the temperature at which sulfur is purged. The value is determined previously by tests. In case where this catalyst temperature Tc is equal or superior to the predetermined judgment temperature Tc0, it proceeds to the step S14 as it is. However, if this catalyst temperature Tc is lower than the predetermined judgment temperature Tc0, the sulfur purge can not be performed efficiently. Therefore, in case where this catalyst temperature Tc is judged to be lower than the predetermined judgment temperature Tc0, the catalyst temperature rise control is performed by the catalyst temperature rise control means C241 in the step S13, until the catalyst temperature Tc becomes equal or superior to the predetermined judgment temperature Tc0. Thereafter, it proceeds to the step S14. More particularly, after having performed the catalyst temperature rise control of the step S13 for a predetermined period of time, the catalyst temperature check of the step S12 is repeated. This predetermined period of time is a time concerning the interval for checking the catalyst temperature.

In this catalyst temperature rise control, post-injection in the cylinder of the engine E is performed by a fuel injector 8, or injection in the exhaust pipe is performed by directly injecting HC which is fuel such as gas oil from an HC supply valve 12 to the exhaust passage 4. Thereby, HC is activated on the NOx occlusion reduction type catalyst and the temperature of this catalyst is raised by its oxidation heat. It should be appreciated that EGR control and intake throttling control are also performed in parallel.

In the following steps S14 to S18, the sulfur purge control is performed. First of all, the oxygen concentration is checked in the step S14, to judge if NOx is released from NOx occlusion reduction type catalyst.

In the course of this oxygen concentration check, if the downstream oxygen concentration Od that is detected by the second oxygen concentration sensor 14 is equal or superior to a predetermined threshold Od0 (for instance, about 0 to 0.2%, or about 0.997 to 1.002 which is converted to excess air factor ($\lambda$)), it is judged that the sulfur purge is in the prophase or early stages in which NOx is released. The first air-fuel ratio of $\lambda=0.93$ to 0.98 is set as the target air-fuel ratio, by the first sulfur purge means C242 when converted to excess air factor until the downstream oxygen concentration Od becomes lower than the predetermined threshold Od0, and the first sulfur purge control is performed. In this control, the exhaust gas flowing in the NOx occlusion reduction type catalyst converter 11 is set to a fuel excessive rich air-fuel ratio (air-fuel ratio lower than the theoretical air-fuel ratio) through a feedback control of the upstream oxygen concentration to be detected by the first oxygen concentration sensor 13 and the like, while performing EGR control and intake valve (intake throttle) control for reducing the exhaust gas flow in parallel. More particularly, after having performed the first sulfur purge control of the step S15 for a predetermined period of time, the oxygen concentration check of the step S14 is repeated. This predetermined period of time is a time concerning the interval for checking the oxygen concentration.

In this first sulfur purge control, as the NOx occlusion reduction type catalyst becomes oxygen-free and high temperature state, sulfur that has been occluded in the form of sulfate on the occluding material of the high temperature NOx occlusion reduction type catalyst is released in the form of sulfur dioxide ($SO_2$). On the other hand, NOx that has been occluded simultaneously in the form of nitride is released in the form of nitrogen dioxide ($NO_2$). This nitrogen dioxide ($NO_2$) is reduced by the catalytic action of a precious metal oxidation catalyst, becomes nitrogen ($N_2$), and at the same time generates oxygen ($O_2$). Carbon monoxide (CO) in the exhaust gas is oxidized and becomes harmless, and is released into the atmospheric air in the form of carbon dioxide ($CO_2$).

Hence, in the sulfur purge during which this NOx is being released, release of carbon monoxide (CO) into the atmospheric air (CO slip) hardly occurs. In addition, the downstream oxygen concentration Od, which is detected by the second oxygen concentration sensor 14 in the downstream of the NOx occlusion reduction type catalyst converter 11, becomes equal or superior to the predetermined threshold Od0 by oxygen ($O_2$) that is generated by reduction of nitrogen dioxide ($NO_2$).

The reaction of the release of NOx that has been occluded in the form of nitride occurs more easily than the release of sulfur that has been occluded in the form of sulfate on the occluding material of the NOx occlusion reduction type catalyst. Therefore, release of NOx terminates before the completion of the sulfur purge, as the sulfur purge progresses. As this NOx release approaches its termination, the production of oxygen ($O_2$) also decreases. Consequently, if this first sulfur purge control is sustained, carbon monoxide (CO) in the exhaust gas can not be oxidized completely, and the quantity of carbon monoxide (CO) that is released into the atmospheric air increases, provoking CO slip.

In order to avoid the generation of this CO slip, in the present invention, the downstream oxygen concentration Od is monitored, and the oxygen concentration is checked in the step S14. It is judged that the sulfur purge has entered the anaphase or termination stage where the release of NOx has stopped, in case the downstream oxygen concentration Od begins to fall suddenly and becomes lower than the predetermined threshold Od0. Then, the first sulfur purge control is terminated to switch over to the second sulfur purge control of the step S18.

In this second sulfur purge control, the second air-fuel ratio of $\lambda=0.997$ to 1.002 is set as the target air-fuel ratio when converted to excess air factor by the second sulfur purge means C243 until it is judged that the sulfur purge in the step S17 has been terminated, and the second sulfur purge control is performed. In this control, the air-fuel ratio of the exhaust gas flowing in the NOx occlusion reduction type catalyst converter 11 is set to a stoichiometric air-fuel ratio (theoretical air-fuel ratio) through feedback control of the upstream oxygen concentration to be detected by the first oxygen concentration sensor 13 and the like, while performing EGR control or intake valve control for reducing the exhaust gas flow in parallel, similarly to the first sulfur purge control. More particularly, after having performed the second sulfur purge control of the step S18 for a predetermined period of time, the calculation of sulfur desorption quantity integrated value Sp of the step 16 and the check of termination of the sulfur purge of the step S17 are repeated. This predetermined period of time is a time concerning the interval for checking the sulfur purge termination.

Little oxygen ($O_2$ remains in the exhaust gas of the NOx occlusion reduction type catalyst converter 11 through the rise of the upstream oxygen concentration Ou, by setting this target air-fuel ratio from the first air-fuel ratio to the second air-fuel ratio and by setting the air-fuel ratio state of the exhaust gas flowing in the NOx occlusion reduction type catalyst converter 11 from the rich air-fuel ratio state to the stoichiometric air-fuel ratio state. Hence, carbon monoxide (CO) in the exhaust gas is oxidized and becomes harmless by this oxygen ($O_2$), and is released in the atmospheric air with the form of carbon dioxide ($CO_2$). Consequently, it is possible to sustain the sulfur purge, while preventing CO slip, even after the termination of the NOx release.

The judgment of the sulfur purge termination in the step S17 is performed by judging if the sulfur desorption quantity integrated value Sp calculated in the step 16 (sulfur release quantity integrated value) is equal or superior to the sulfur accumulation quantity Sa calculated in the step S10. This sulfur desorption quantity integrated value Sp is determined by integrating desulfurization quantity obtained by referring to engine driving state, and desulfurization quantity map inputted beforehand and the like, based on the temperature to be detected by the first and the second temperature sensors 15 and 16. The sulfur purge is judged to have terminated and the second sulfur purge control is terminated to return, in the case where the sulfur desorption quantity integrated value Sp becomes equal or superior to the sulfur accumulation quantity Sa, in the judgment of the step S17. It should be appreciated that, it proceeds to the step 18 if the sulfur desorption quantity integrated value Sp is not equal or not superior to the sulfur accumulation quantity Sa in the judgment of the step S17. Then, in the step S18, after having performed the second sulfur purge for a predetermined period of time, it returns to the step S16, for integrating the sulfur desorption quantity integrated value Sp. Then, the judgment of the step S17 is repeated.

According to the aforementioned sulfur purge control and exhaust gas purifying system 1, the sulfur purge can be performed efficiently, while preventing carbon monoxide (CO) from leaking into the atmospheric air, during the sulfur purge, and especially during the sulfur purge anaphase in which the release of NOx has terminated.

In the aforementioned composition, the emission control device 10 was described to be composed only of the NOx occlusion reduction type catalyst converter 11; however, the present invention can also be applied to the cases where it is composed by combining with a diesel particulate filter (DPF) that is formed as a separate body, or where it is composed by supporting the NOx occlusion reduction type catalyst by the DPF.

What is claimed is:

1. A sulfur purge control method, using an exhaust gas purifying system for removing NOx by a NOx occlusion reduction type catalyst from the exhaust gas of an internal combustion engine, said exhaust gas purifying system having;

an oxygen concentration detection means for detecting the oxygen concentration in the downstream of the NOx occlusion reduction type catalyst;
a sulfur purge start judgment means; and
a sulfur purge control means accompanying the control of the air-fuel ratio state of the exhaust gas;
said sulfur purge control method comprising steps of:
controlling the air-fuel ratio in the exhaust gas by setting a target air-fuel ratio to a predetermined first air-fuel ratio which is a rich air-fuel ratio by means of the sulfur purge control means after starting the sulfur purge; and
thereafter, controlling the air-fuel ratio in the exhaust gas by changing the target air-fuel ratio to a predetermined second air-fuel ratio which is a stoichiometric air-fuel ratio, when the oxygen concentration measured by an oxygen concentration detection means in the downstream of a NOx occlusion reduction type catalyst becomes lower than a predetermined threshold.

2. The sulfur purge control method of claim 1, wherein:
the predetermined first air-fuel ratio is between 0.93 and 0.98 which is converted to the excess air factor; and
the predetermined second air-fuel ratio is between 0.997 and 1.002 which is converted to the excess air factor.

3. An exhaust gas purifying system for removing NOx by a NOx occlusion reduction type catalyst from the exhaust gas of an internal combustion engine, comprising:
an oxygen concentration detection means for detecting the oxygen concentration in the downstream of the NOx occlusion reduction type catalyst;
a sulfur purge start judgment means; and
a sulfur purge control means accompanying the control of the air-fuel ratio state of the exhaust gas, wherein
said sulfur purge control means includes;
a first sulfur purge control means for controlling the air-fuel ratio state in the exhaust gas targeting a predetermined first air-fuel ratio which is a rich air-fuel ratio; and
a second sulfur purge control means for controlling the air-fuel ratio state in the exhaust gas targeting a predetermined second air-fuel ratio which is a stoichiometric air-fuel ratio, and wherein after the start of sulfur purge, the sulfur purge is controlled by said first sulfur purge control means when the oxygen concentration in the downstream of the NOx occlusion reduction type catalyst measured by said oxide concentration detection means is a predetermined threshold or more; and the sulfur purge is controlled by said second sulfur purge control means when it is lower than the predetermined threshold.

4. The exhaust gas purifying system of claim 3, wherein
the predetermined first air-fuel ratio is between 0.93 and 0.98 which is converted to the excess air factor; and
the predetermined second air-fuel ratio is between 0.997 and 1.002 which is converted to the excess air factor.

* * * * *